(12) United States Patent
Lee et al.

(10) Patent No.: US 8,004,114 B2
(45) Date of Patent: Aug. 23, 2011

(54) TWO-STAGE POWER SUPPLY SYSTEM

(75) Inventors: Yu-Lung Lee, Nanjhuang Township, Miaoli County (TW); Tsong-Hwa Chen, Chung Ho (TW); Kuo-Tian Cheng, Tucheng (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 458 days.

(21) Appl. No.: 12/274,118

(22) Filed: Nov. 19, 2008

(65) Prior Publication Data
US 2009/0296435 A1 Dec. 3, 2009

Related U.S. Application Data

(60) Provisional application No. 61/057,948, filed on Jun. 2, 2008.

(51) Int. Cl.
*H02J 9/00* (2006.01)
(52) U.S. Cl. .......................................................... 307/64
(58) Field of Classification Search ................ 307/64
See application file for complete search history.

(56) References Cited

U.S. PATENT DOCUMENTS 7,669,066 B2 * 2/2010 Sakakibara et al. .......... 713/300
* cited by examiner

*Primary Examiner* — Jared J Fureman
*Assistant Examiner* — Dru M Parries
(74) *Attorney, Agent, or Firm* — Kile Goekjian Reed & McManus PLLC

(57) ABSTRACT

A two-stage power supply system includes a standby power circuit, a main power circuit, a driver and, a rectifier. Moreover, the standby power circuit is used to convert a utility AC (Alternating Current; AC) into a standby AC. The main power circuit is used to convert the utility AC into a main AC. Furthermore, the driver is coupled to the main power circuit so as to control whether or not the main power circuit outputs the main AC to the rectifier. Finally, the rectifier is coupled to the standby power circuit, the main power circuit, and a load, wherein the rectifier rectifies the standby AC alone for outputting a standby DC (Direct Current; DC) to the load, or rectifies an integrated AC of the standby AC and the main AC for outputting a supply DC to the load.

7 Claims, 2 Drawing Sheets

TWO-STAGE POWER SUPPLY SYSTEM

CROSS-REFERENCE TO RELATED APPLICATIONS

The present application claims priority to provisional application Ser. No. 61/057,948 filed Jun. 2, 2008, the entire contents of which are hereby incorporated by reference.

BACKGROUND OF THE INVENTION

1. Field of the Invention

The present invention is related to a two-stage power supply system; in particular, to a power supply system having a standby power supply mode and a normal power supply mode.

2. Description of Related Art

Due to rapid decrease in global storage of consumptive energy such as coal, crude oil and the like, the problem of consumptive energy waste is becoming a vital issue, resulting in people paying more attention to environmental protection objectives regarding energy savings and green energies. Currently, there are already several countries/areas such as EU, California in US, Korea, and Japan announcing regulations on product standby status (standby power<1 W); meanwhile, at present there are also many home electronic devices introducing power-saving designs therein.

After numerous discussions, tests, and evaluations, many experts consistently agree that to achieve the purpose of power-saving in an electronic product, it is necessary to improve the power consumption of the product in standby mode, since general home electronic devices or common products, e.g. computer screen, television etc., tend not to be unplugged while not in use, but are left in standby mode. Therefore, general home electronic devices or common products are frequently in the standby mode, thus wasting substantial amount of power; as a result, the reduction of standby power in electronic products has become one of the most crucial topics now-a-days.

Consequently, it is desirable for the industry to be able to provide a power supply system allowing for energy conservation, and also to enable smooth initiation as a product utilizing the power supply system becomes operative.

SUMMARY OF THE INVENTION

In view of this, the present invention provides a two-stage power supply system having a standby power supply mode and a normal power supply mode. The two-stage power supply system according to the present invention can be used to meet the power requirement of a load; when the load is coupled to a power source through the two-stage power supply system and the load is in a standby condition, at this moment, the two-stage power supply system is in the standby power supply mode, so as to provide the minimum power required by the load; on the other hand, when the load starts to operate, the two-stage power supply system is in the normal power supply mode so as to supply the required power to the load for normal operations.

The two-stage power supply system in a first preferred embodiment of the present invention has a standby power supply mode and a normal power supply mode, comprising a standby power circuit, a main power circuit, a driver, and a rectifier. Therein the standby power circuit is for receiving an alternating current (AC) power, and outputting a standby AC power. The main power circuit is for receiving the AC power and outputting a main AC power. The driver is coupled to the main power circuit, for stopping the main power circuit from outputting the main AC power when in the standby power supply mode, and controlling the main power circuit to outputting the main AC power when in the normal power supply mode. The rectifier is coupled to the standby power circuit, the main power circuit, and a load, in which the rectifier is for rectifying the standby AC power into a standby direct current (DC) power to provide to the load when in the standby power supply mode, and for rectifying an integrated power of the standby AC power and the main AC power into a supply DC power to provide to the load when in the normal power supply mode.

In contrast to the aforementioned first preferred embodiment of the present invention, the two-stage power supply system in a second preferred embodiment of the present invention further comprises a DC voltage step-down circuit and a voltage regulator circuit, installed between the rectifier and the load. Therein the DC voltage step-down circuit is coupled to the rectifier, in which the DC voltage step-down circuit supplies a standby DC power voltage step-down when in the standby power supply mode, and provides a supply DC power voltage step-down when in the normal power supply mode. The voltage regulator circuit is coupled to the DC voltage step-down circuit and the load, in which the voltage regulator circuit stabilizes the standby DC power to the load after the voltage step-down of the DC voltage step-down circuit when in the standby power supply mode, and stabilizes the supply DC power to the load after the voltage step-down of the DC voltage step-down circuit when in the normal power supply mode.

In summary of the aforementioned descriptions, when the two-stage power supply system according to the present invention is in the standby power supply mode, the standby AC power provided by the standby power circuit thereof passes through the rectifier, the DC voltage step-down circuit and the voltage regulator circuit to generate a standby DC power. The generated standby DC power is used to provide the minimum power consumption required for the standby of the load. At this moment, the main power circuit is not initiated yet, thus it has no power consumption. Therefore, the two-stage power supply system according to the present invention allows general home electronic devices or common electronic products to effectively reduce power consumption during standby mode, further meeting the regulations on power saving (standby power<1 W).

Additionally, when the two-stage power supply system according to the present invention is in the normal power supply mode, the standby AC power provided by the standby power circuit and the main AC power provided by the main power circuit will be integrated (i.e. the integrated power), and, meanwhile, through the rectifier, the DC voltage step-down circuit, and, the voltage regulator, it is possible to generate a DC supply power which can be used to provide the required power consumed by the load for normal operations. In this way, the two-stage power supply system according to the present invention can supply power to general home electronic devices or common electronic products in a normal fashion, allowing them to successfully start and perform normal operations.

The aforementioned illustrations and following detailed descriptions are exemplary for the purpose of further explaining the scope of the present invention. Other objectives and advantages related to the present invention will be illustrated in the subsequent descriptions and appended drawings.

DETAILED DESCRIPTION OF PREFERRED EMBODIMENTS

Figure 1:
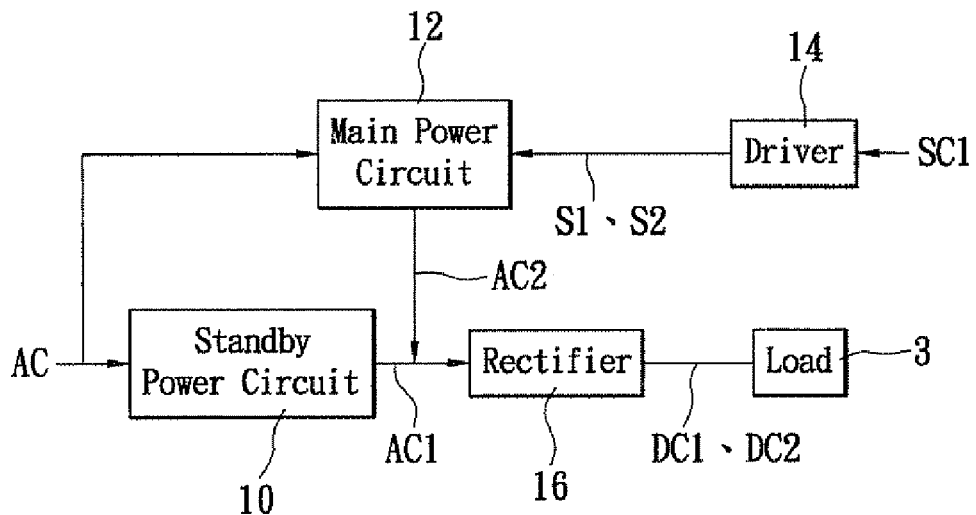
FIG. 1 is a circuit block diagram of the two-stage power supply system in a first preferred embodiment of the present invention.

Refer to FIG. 1, wherein a circuit block diagram of the two-stage power supply system in a first preferred embodiment of the present invention is shown. The two-stage power supply system 1 has a standby power supply mode and a normal power supply mode, which can respectively provide require power to a load 3 for operating in a standby mode or in an active mode. The two-stage power supply system 1 comprises a standby power circuit 10, a main power circuit 12, a driver 14, and a rectifier 16. Therein the standby power circuit 10 is used to receive an alternating current (AC) power and performs voltage step-down on the AC power to output a standby AC power AC1. The main power circuit 12 is similarly used to receive the AC power and performs voltage step-down on the AC power to output a main AC power AC2.

Referring again to FIG. 1, the driver 14 is coupled to the main power circuit 12; and the rectifier 16 is coupled to the standby power circuit 10, the main power circuit 12, and a load 3. When the load 3 is in the standby mode, the driver 14 is controlled by a control signal SC1 to output a termination signal S1 to the main power circuit 12, causing the main power circuit 12 to stop outputting the main AC power AC2, thus controlling the two-stage power supply system 1 to operate in the standby power supply mode. At this moment, the rectifier 16 alone rectifies the standby AC power AC1 into a standby DC power DC1 so as to provide power to the load 3 for operations in the standby mode, thereby effectively reducing power consumption and further meeting the regulations on power saving (standby power<1 W).

Referring once again to FIG. 1, when the load 3 is in the active mode, the driver 14 is controlled by the control signal SC1 to output a drive signal S2 to the main power circuit 12, causing the main power circuit 12 to output the main AC power AC2, thereby controlling the two-stage power supply system 1 to operate in the normal power supply mode. At this time, the rectifier 16 rectifies an integrated power of the standby AC power AC1 and the main AC power AC2 into a supply DC power DC2 so as to provide to the load 3, allowing the load 3 to successfully start in the active mode for normal operations.

Figure 2:
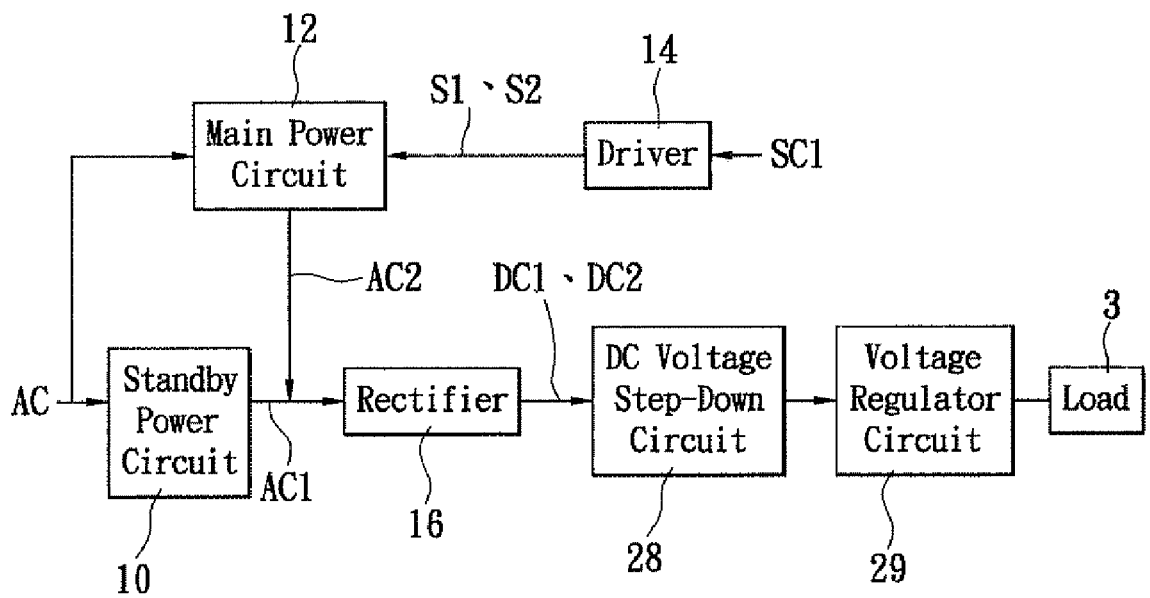
FIG. 2 is a circuit block diagram of the two-stage power supply system in a second preferred embodiment of the present invention.

In conjunction with FIG. 1, refer now to FIG. 2 illustrating a circuit block diagram of the two-stage power supply system in a second preferred embodiment of the present invention. The components in the second preferred embodiment of the present invention that are the same to the counterparts found in the first preferred embodiment are identically marked. The circuit operation principle and effects achieved by the first and second preferred embodiments are identical, the major difference is in that: the two-stage power supply system 2 in the second preferred embodiment further comprises a DC voltage step-down circuit 28 and a voltage regulator circuit 29. The DC voltage step-down circuit 28 is coupled to the rectifier 16, providing voltage step-down on the standby DC power DC1 when in the standby power supply mode, and providing voltage step-down on the supply DC power DC2 when in the normal power supply mode. The voltage regulator circuit 29 is coupled to the DC voltage step-down circuit 28 and the load 3, providing the standby DC power DC1 to the load 3 after voltage stabilization and voltage step-down when in the standby power supply mode, and providing the supply DC power DC2 to the load 3 after voltage stabilization and voltage step-down when in the normal power supply mode.

Figure 3:
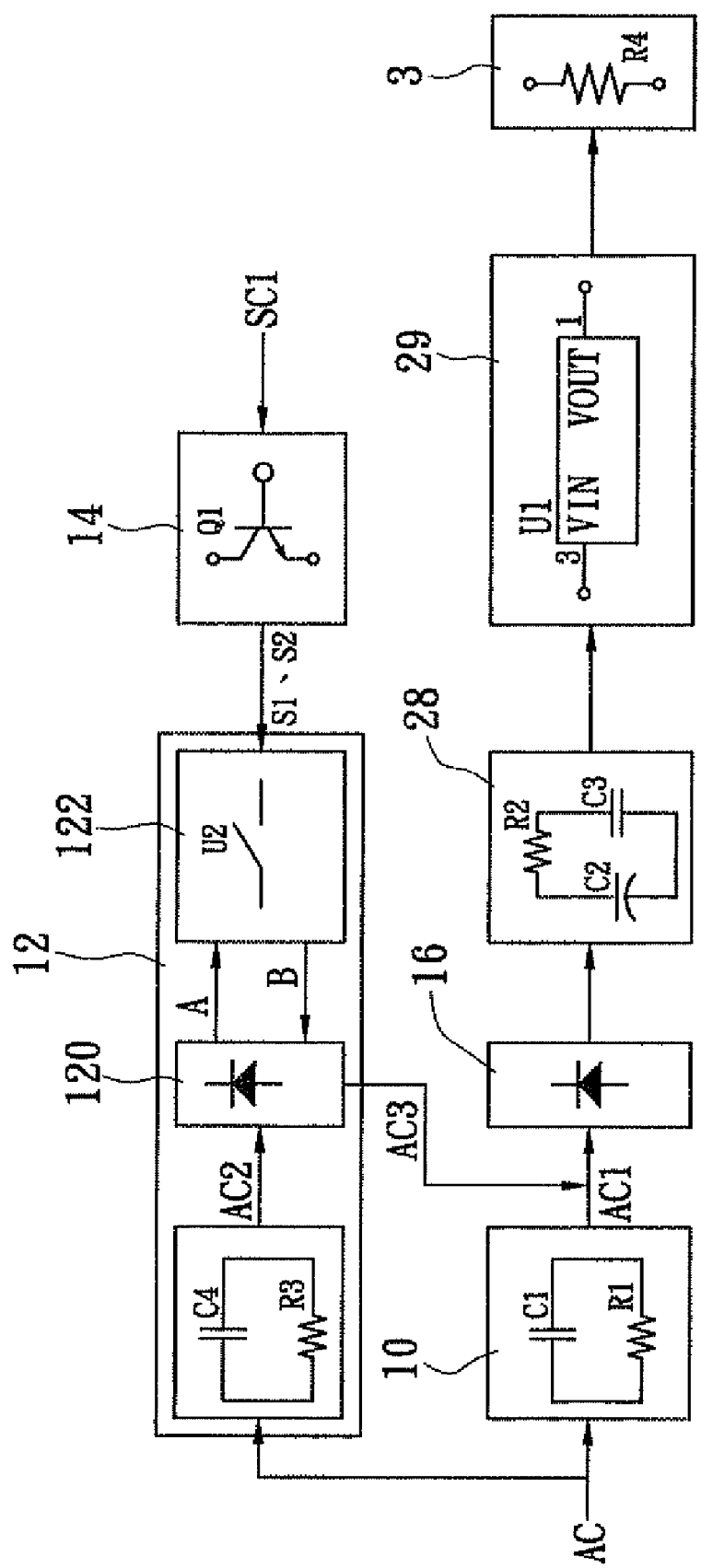
FIG. 3 is a diagram of circuit components in the second preferred embodiment of the present invention.

In conjunction with FIG. 2, refer now to FIG. 3. FIG. 3 shows a diagram of circuit components in the second preferred embodiment of the present invention. The standby power circuit 10 placed in the two-stage power supply system 2 is an AC voltage step-down circuit, composed of a first capacitor C1 and a first resistor R1 connected in parallel; or alternatively, it may be a voltage step-down integrated circuit (IC) or a component thereof with voltage step-down feature. In the standby power circuit 10, after the AC power AC passing through the first capacitor C1 and first resistor R1, or otherwise passing through the voltage step-down IC or component thereof with voltage step-down feature, it will generate the standby AC power AC1 with stepped-down voltage.

Refer now again to FIGS. 2 and 3. The main power circuit 12 placed in the two-stage power supply system 2 can be a capacitor C4, a resistor R3 connected in parallel with the capacitor C4, a buffer circuit 120, and a controller 122. The buffer circuit 120 has an input end, an output end, and a control end, in which the input end is connected in series with the capacitor C4 and resistor R3 that are connected in parallel, the output end is connected in series with the rectifier 16, and the control end is connected to the output of the controller 122. The buffer circuit 120 is formed by a diode or other buffering integrated circuit (IC).

Refer once again to FIGS. 2 and 3. The driver 14 consists of a transistor Q1 or drive component thereof wherein the transistor or drive component thereof is controlled by the control signal SC1 in order to form an OFF state or ON state, and generates the termination signal S1 when in the OFF state, and generates the drive signal S2 when in the ON state. The termination signal S1 and drive signal S2 are used by the controller 122 as the basis of controlling the buffer circuit 120.

Meanwhile, the controller 122 is composed of a photocoupler U2 or controlled switch component, which controls the nodes A and B in the buffer circuit 120 so as to form an open circuit state according to the termination signal S1 when in the standby power supply mode; at this moment, the main AC power AC2 can not be transferred via the buffer circuit 120, thus there is no power supplied on the output end AC3 of the buffer circuit 120. Additionally, when the controller 122 is in the normal power supply mode, it controls the nodes A and B in the buffer circuit 120 so as to form a short circuit state based on the drive signal 82; now the main AC power AC2 can be transferred through the buffer circuit 120, and thereby a power supply can be generated on the output end AC3 of the buffer circuit 120.

Furthermore, the DC voltage step-down circuit 28 is a commonly used DC/DC voltage step-down converter, essentially consisting of capacitors C2-C3 and a resistor R2 together with a Zener diode ZD (not shown). Meanwhile, the voltage regulator circuit 29 adopts a commonly used voltage regulator integrated circuit U1.

In summary of the aforementioned descriptions, when the two-stage power supply system according to the present invention is in the standby power supply mode, it provides the standby AC power alone to the rectifier, the DC voltage step-down circuit, and the voltage regulator circuit, allowing to generate a standby DC power to the load for use, thereby offering the minimum power consumption required by the load while the load is in standby. At this moment, the main power source has not started yet, accordingly there is no generation of any power consumption. Therefore, the two-stage power supply system according to the present invention allows general home electronic devices or common electronic products to reduce power consumption during standby, further meeting the requirement of power saving regulations (standby power<1 W).

Additionally, when the two-stage power supply system according to the present invention is in the normal power supply mode, which provides the integrated power of the standby AC power and the main DC power to the rectifier, the DC voltage step-down circuit, and the voltage regulator circuit so as to generate a DC power supply to the load for use, thereby meets the power consumption required by the load for normal operations. In this way, the two-stage power supply system according to the present invention can supply the general home electronic devices or common electronic products with required power in a normal fashion, enabling successful initiation and normal operations.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A two-stage power supply system having a standby power supply mode and a normal power supply mode, comprising:
    a standby power circuit, for receiving an alternating current (AC) power and perform voltage step-down on the AC power so as to generate a standby AC power;
    a driver, for outputting a termination signal when in the standby power supply mode, and outputting a drive signal when in the normal power supply mode;
    a main power circuit, coupled to the driver and controlled by the drive signal, for performing voltage step-down on the AC power so as to generate a main AC power;
    a rectifier, coupled to the standby power circuit and the main power circuit, the rectifier is for rectifying the standby AC power into a standby DC power when in the standby power supply mode, and for rectifying an integrated power of the standby AC power and the main AC power into a supply DC power when in the normal power supply mode;
    a direct current (DC) voltage step-down circuit, coupled to the rectifier, the DC voltage step-down circuit is for providing voltage step-down on the standby DC power when in the standby power supply mode, and providing voltage step-down on the supply DC power when in the normal power supply mode; and
    a voltage regulator circuit, coupled to the DC voltage circuit and a load, the voltage regulator circuit providing the standby DC power to the load after voltage stabilization and voltage step-down when in the standby power supply mode, and providing the supply DC power to the load after voltage stabilization and voltage step-down when in the normal power supply mode.

2. The two-stage power supply system device according to claim 1, wherein the standby power circuit consists of a first capacitor and a first resistor, in which the first resistor is connected in parallel with the first capacitor.

3. The two-stage power supply system device according to claim 2, wherein the main power circuit comprises:
    a second capacitor, for receiving the AC power;
    a third resistor, connected in parallel with the second capacitor;
    a buffer circuit, having an input end, an output end, and a control end, in which the input end is connected in series with the second capacitor, the output end is connected in series with the rectifier; and
    a controller, coupled to the control end of the buffer circuit, the controller controlling the buffer circuit to cut off the main AC power to the rectifier when in the standby power supply mode, and controlling the buffer circuit to transfer the main AC power to the rectifier when in the normal power supply mode.

4. The two-stage power supply system device according to claim 1, wherein the driver consists of a switch, the switch being controlled by a control signal to form an OFF state or an ON state, and generating the termination signal when in the OFF state and the driver signal when in the ON state.

5. A two-stage power supply system having a standby power supply mode and a normal power supply mode, comprising:
    a standby power circuit, for receiving an alternating current (AC) power and outputting a standby AC power;
    a main power circuit, for receiving the AC power and outputting a main AC power;
    a driver, coupled to the main AC power, for stopping the main power circuit from outputting the main AC power when in the standby power supply mode, and controlling the main power circuit to outputting the main AC power when in the normal power supply mode; and
    a rectifier, coupled to the standby power circuit, the main power circuit, and a load, the rectifier is for rectifying the standby AC power into a standby DC power to provide to the load when in the standby power supply mode, and for rectifying an integrated power of the standby AC power and the main AC power into a supply DC power to provide to the load when in the normal power supply mode; and wherein the standby power circuit consists of a first capacitor and a first resistor, in which the first resistor is connected in parallel with the first capacitor.

6. The two-stage power supply system device according to claim 5, wherein the main power circuit comprises:
    a second capacitor, for receiving the AC power;
    a third resistor, connected in parallel with the second capacitor;
    a buffer circuit, having an input end, an output end, and a control end, in which the input end is connected in series with the second capacitor, the output end is connected in series with the rectifier; and
    a controller, coupled to the control end of the buffer circuit, the controller controlling the buffer circuit to cut off the main AC power to the rectifier when in the standby power supply mode, and controlling the buffer circuit to transfer the main AC power to the rectifier when in the normal power supply mode.

7. The two-stage power supply system device according to claim 6, wherein the driver consists of a switch, the switch being controlled by a control signal to form an OFF state or an ON state, and controlling the buffer circuit to cut off the main AC power to the rectifier when in the OFF state, and controlling the buffer circuit to transfer the main AC power to the rectifier when in the ON state.

* * * * *